United States Patent
Ryu et al.

(10) Patent No.: US 11,473,540 B2
(45) Date of Patent: Oct. 18, 2022

(54) FUEL TUBE PROTECTOR FOR VEHICLE

(71) Applicants: Hyundai Motor Company, Seoul (KR); Kia Motors Corporation, Seoul (KR)

(72) Inventors: Bu Yeol Ryu, Hwaseong-si (KR); Tac Koon Kim, Seoul (KR); Seung Hwan Park, Seoul (KR); Bo Sung Lee, Hwaseong-si (KR); Hyun Do Jeon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 12 days.

(21) Appl. No.: 17/007,275

(22) Filed: Aug. 31, 2020

(65) Prior Publication Data

US 2021/0140397 A1    May 13, 2021

(30) Foreign Application Priority Data

Nov. 13, 2019  (KR) .................. 10-2019-0144669

(51) Int. Cl.
*F02M 37/00*    (2006.01)
*B60K 15/01*    (2006.01)
*F16L 3/237*    (2006.01)
*F16L 39/00*    (2006.01)
*F16L 57/00*    (2006.01)

(52) U.S. Cl.
CPC ......... *F02M 37/0017* (2013.01); *B60K 15/01* (2013.01); *F16L 3/237* (2013.01); *F16L 39/005* (2013.01); *F16L 57/00* (2013.01)

(58) Field of Classification Search
CPC . F16L 3/1075; F16L 3/22; F16L 3/222; F16L 3/223; F16L 55/035; F16L 57/00; F02M 37/0017; F02M 2200/857; B60K 15/01; B60K 2015/03528
See application file for complete search history.

(56) References Cited

U.S. PATENT DOCUMENTS

| 5,113,717 | A | * | 5/1992 | Plamper | ................ | F16B 7/0433 |
|||||||248/68.1|
| 9,982,808 | B2 | | 5/2018 | Ragner | | |
| 2007/0215757 | A1 | * | 9/2007 | Yuta | ...................... | F16L 55/035 |
|||||||248/68.1|
| 2010/0207001 | A1 | * | 8/2010 | Smith | ..................... | F16L 3/237 |
|||||||248/230.4|

(Continued)

FOREIGN PATENT DOCUMENTS

| DE | 102009005422 | A1 * | 7/2010 | ............ | F16L 55/035 |
| DE | 102013020708 | A1 * | 6/2015 | ......... | F02M 37/0017 |

(Continued)

*Primary Examiner* — Michael A Kessler
(74) *Attorney, Agent, or Firm* — Slater Matsil, LLP

(57) ABSTRACT

A fuel tube protector for a vehicle includes a protective member configured to surround a circumferential surface of a fuel tube disposed between a fuel tank and an internal combustion engine, and a fixing member provided at both distal ends of the protective member to fix the protective member to the fuel tube, wherein each fixing member includes a body surrounding and holding the circumferential surface of the fuel tube, and first fixing legs protruding from a side surface of the body and fastened to the respective distal end of the protective member.

16 Claims, 8 Drawing Sheets

(56) References Cited

U.S. PATENT DOCUMENTS

| | | | |
|---|---|---|---|
| 2013/0076023 A1 | 3/2013 | Schonfeld et al. | |
| 2014/0299723 A1* | 10/2014 | Kato | F16L 3/1222 |
| | | | 248/74.4 |
| 2014/0374544 A1* | 12/2014 | Pearson | F16L 3/12 |
| | | | 248/68.1 |
| 2016/0040822 A1* | 2/2016 | Cetnar | B60T 17/046 |
| | | | 29/428 |
| 2018/0056777 A1* | 3/2018 | Nakamura | B60K 15/01 |

FOREIGN PATENT DOCUMENTS

| | | | | |
|---|---|---|---|---|
| DE | 102017102331 A1 * | 8/2018 | | F16L 55/035 |
| JP | 2001193895 A | 7/2001 | | |
| KR | 19910016448 B1 | 11/1991 | | |
| KR | 1998029416 U | 8/1998 | | |
| KR | 20130032852 A | 4/2013 | | |
| WO | WO-2010011567 A1 * | 1/2010 | | B60R 16/0215 |
| WO | WO-2019012175 A1 * | 1/2019 | | F16L 27/111 |

\* cited by examiner

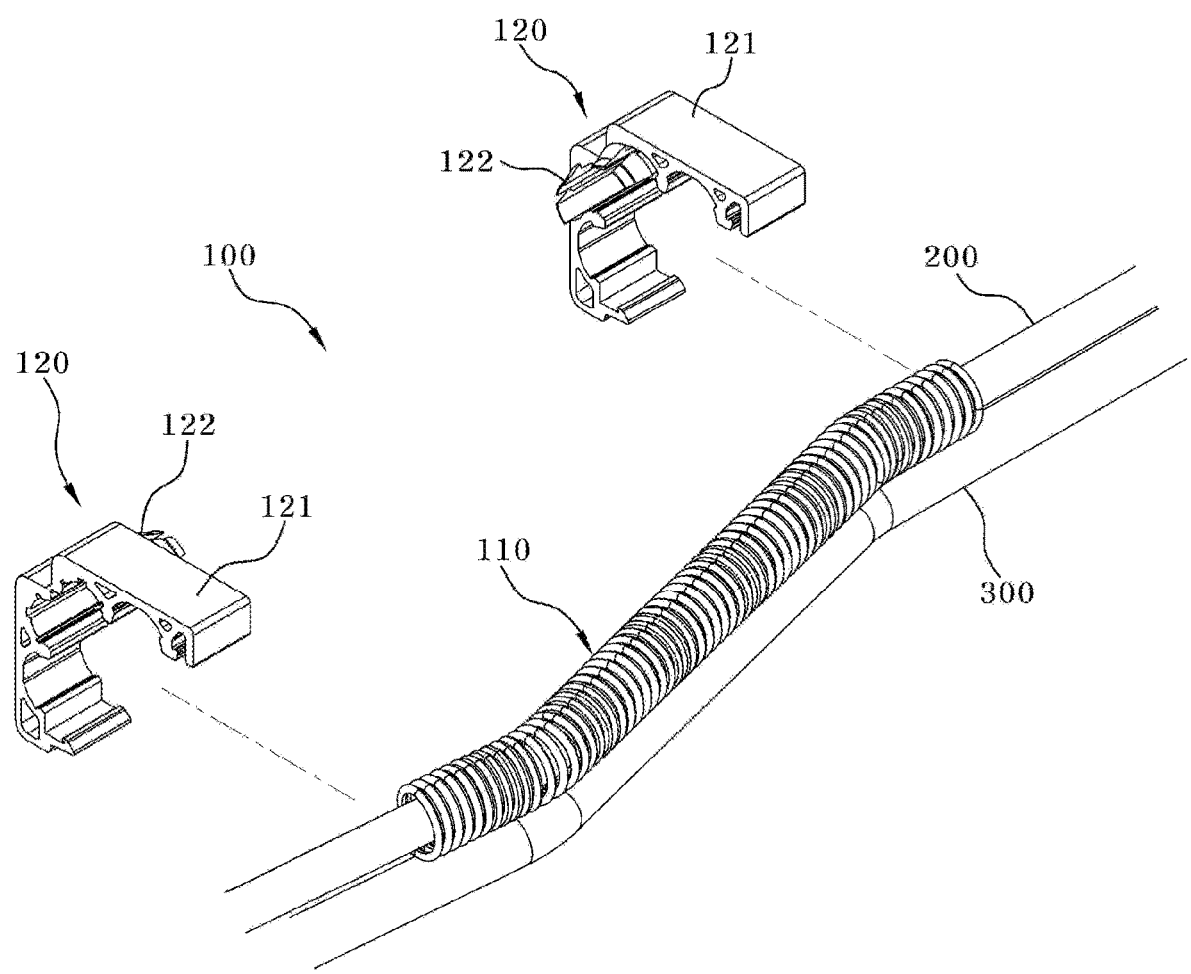
[FIG. 1]

[FIG. 2]
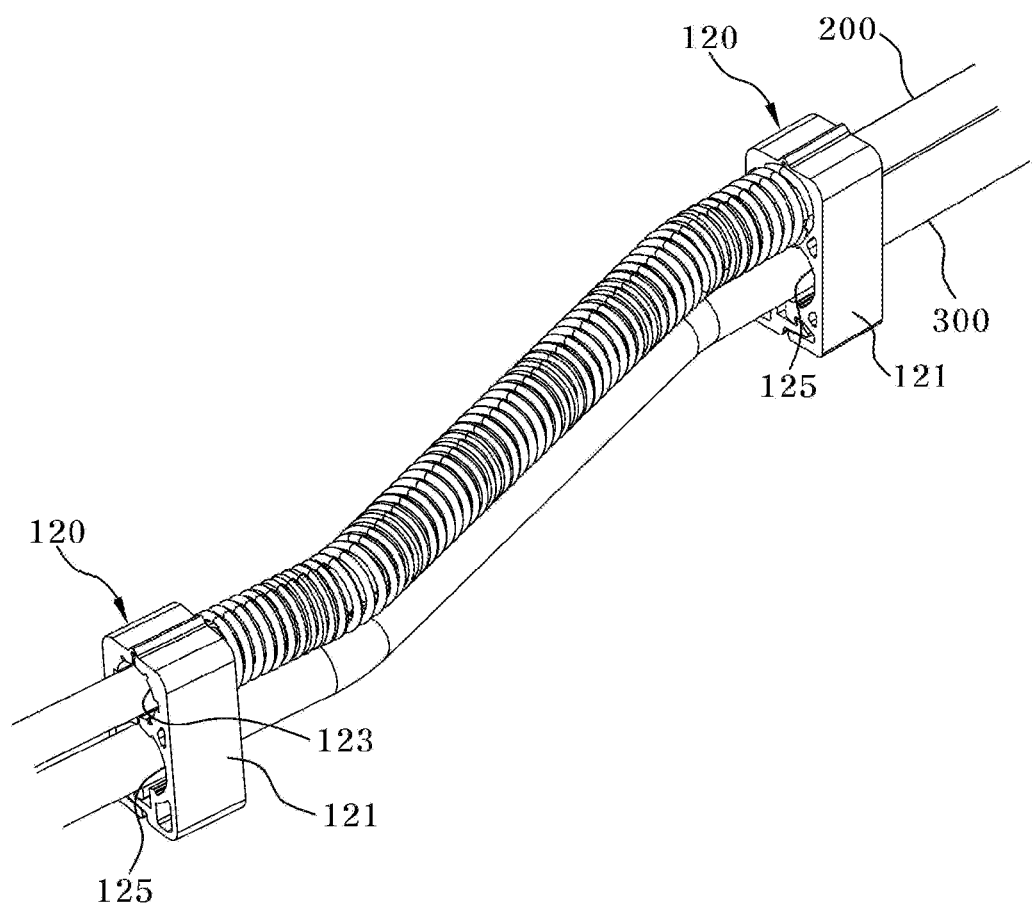

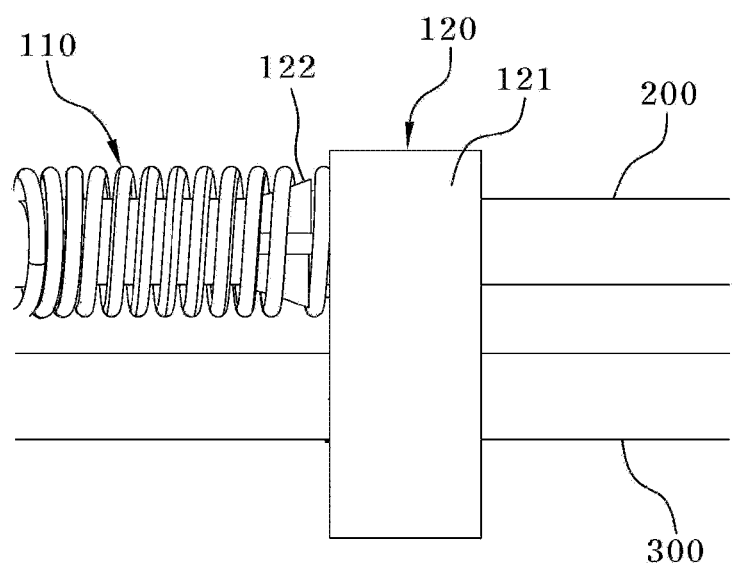
[FIG. 3]

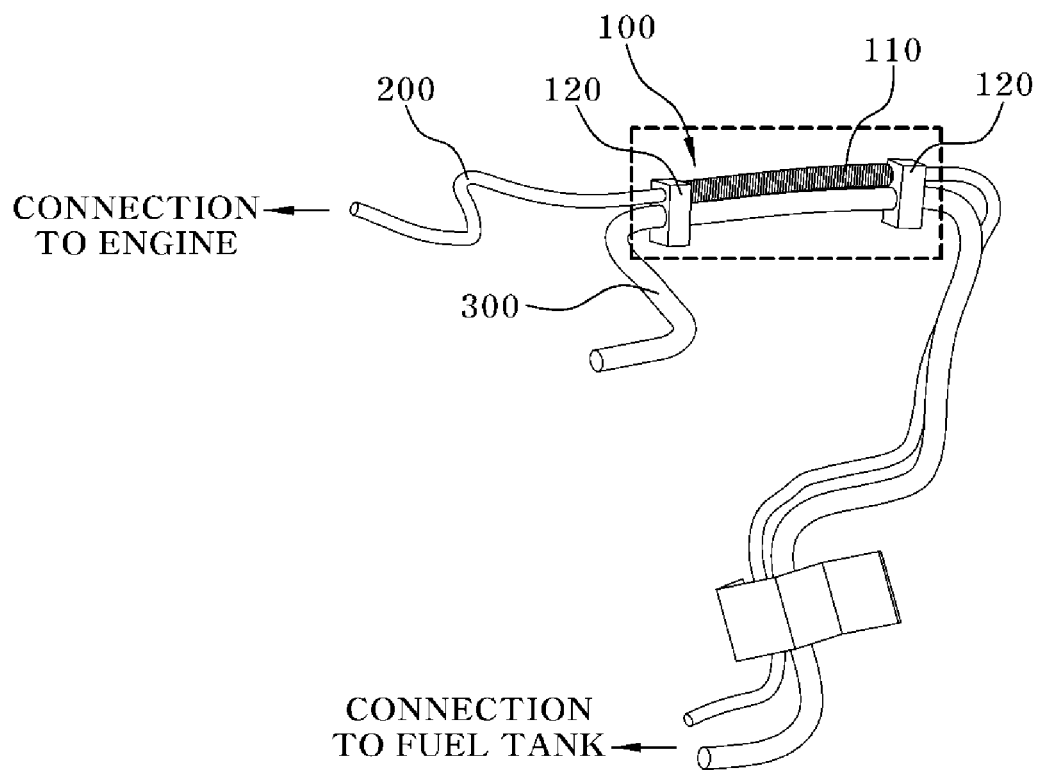
[FIG. 4]

[FIG. 5]
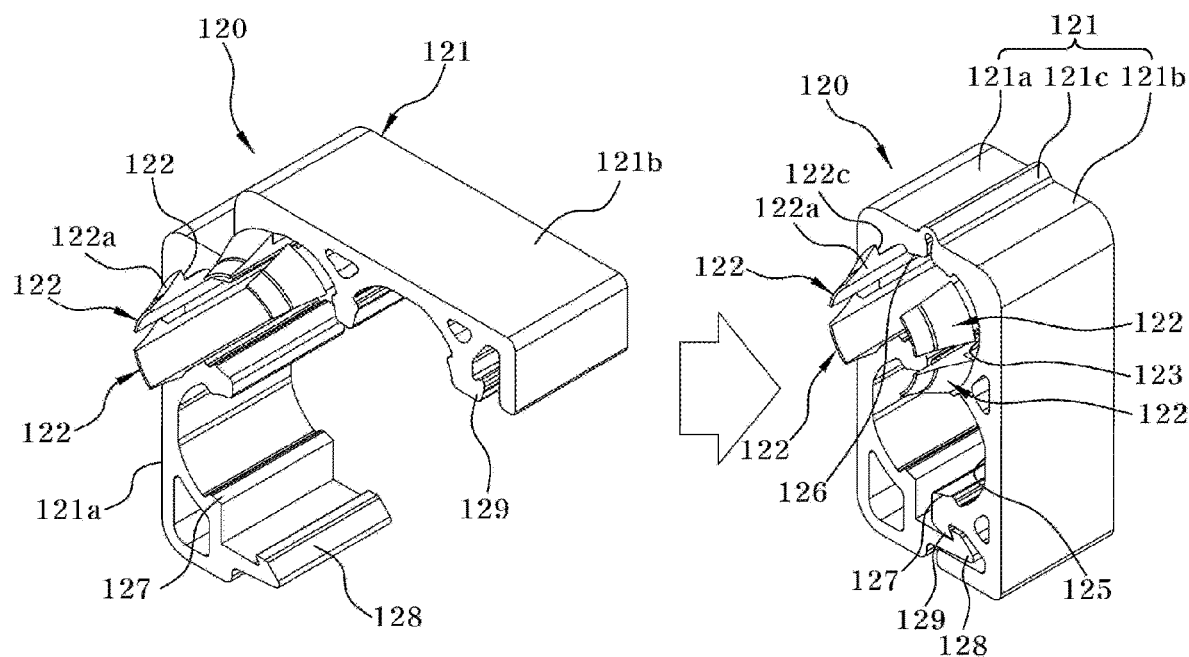

[FIG. 6]
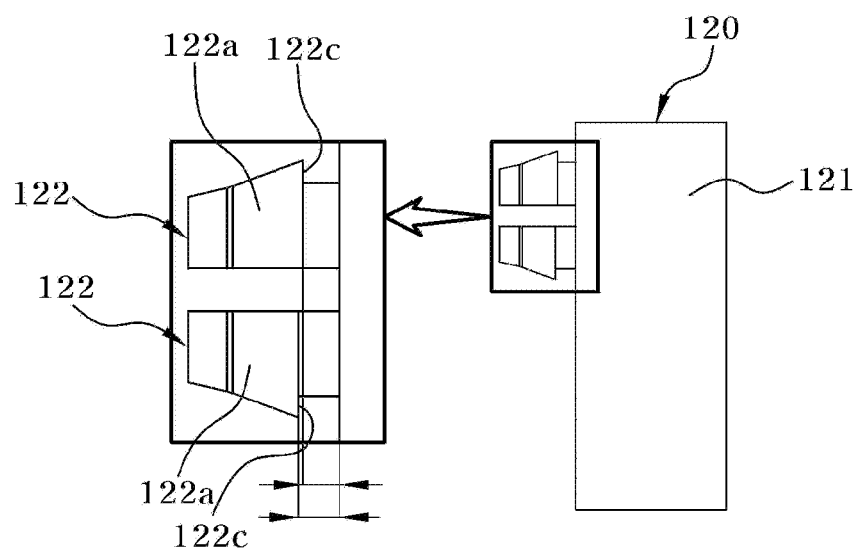
[FIG. 7]
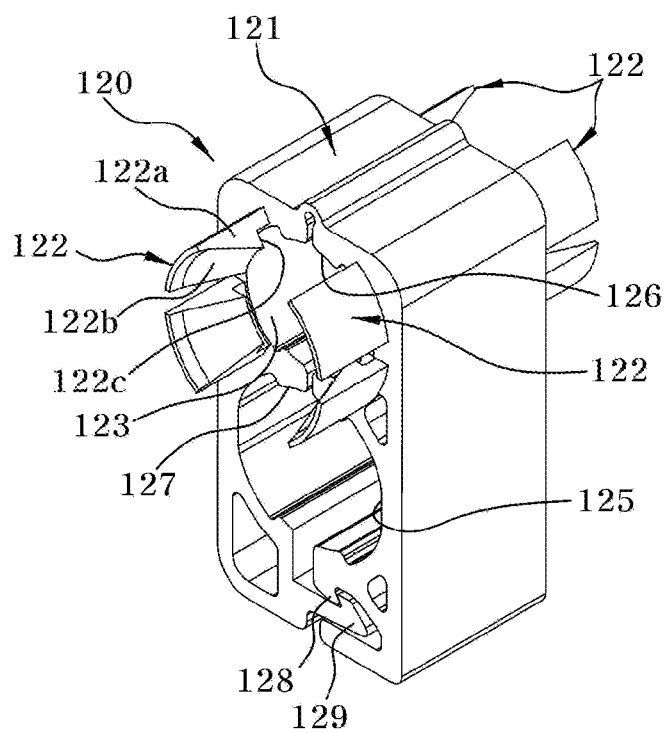

[FIG. 8]
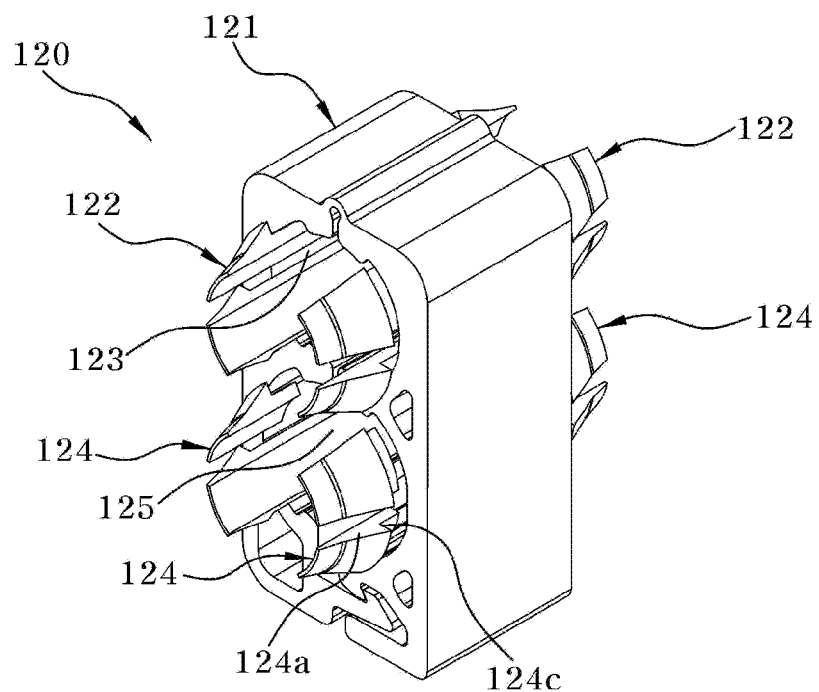
[FIG. 9]
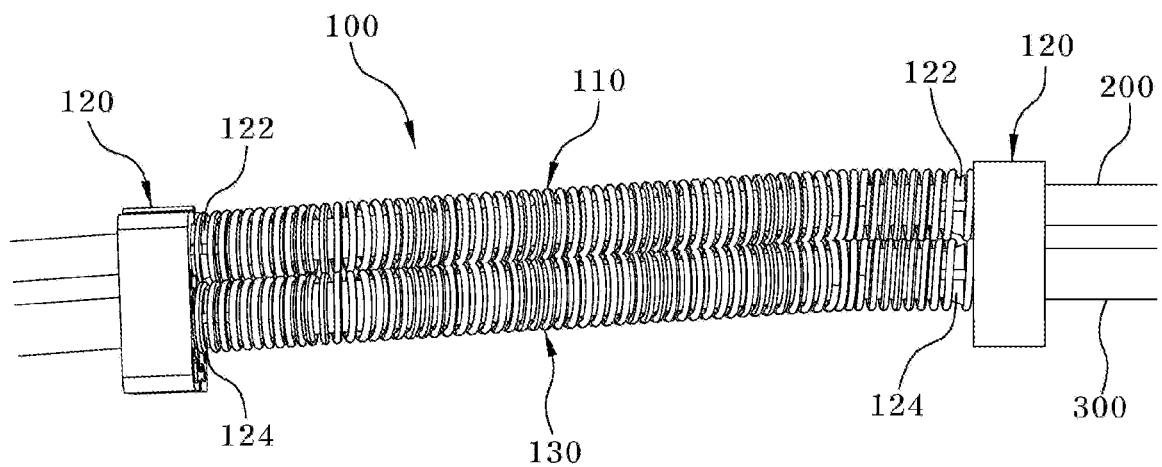

[FIG. 10]
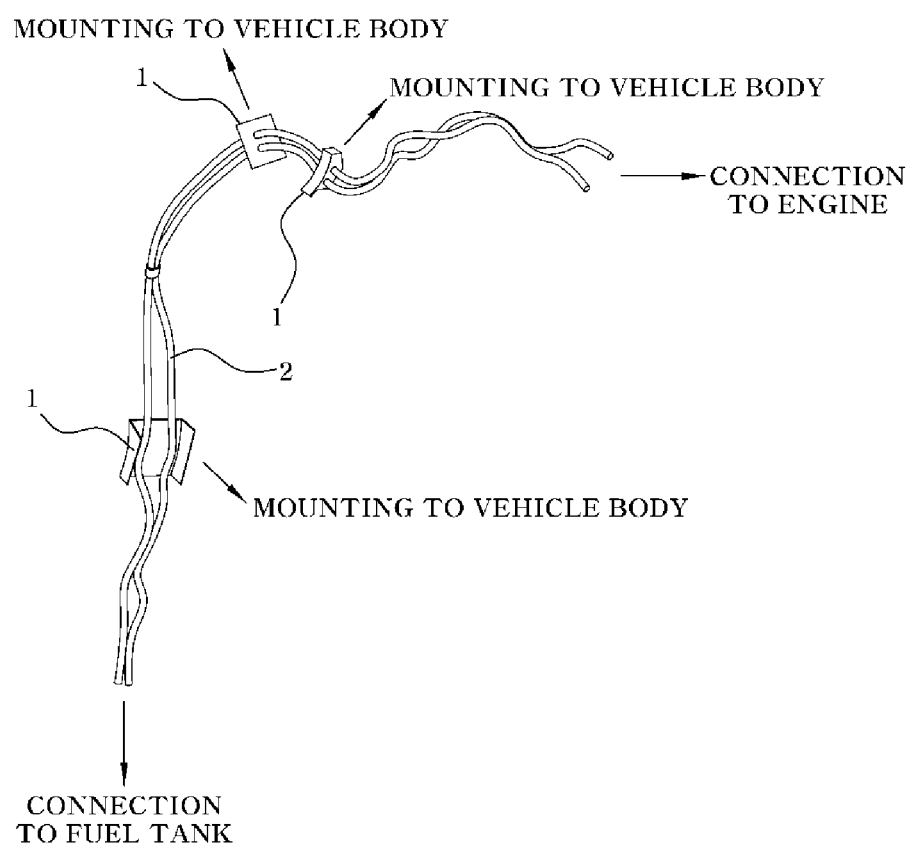

FUEL TUBE PROTECTOR FOR VEHICLE

CROSS-REFERENCE TO RELATED APPLICATIONS

This application claims priority to Korean Patent Application No. 10-2019-0144669, filed on Nov. 13, 2019, which application is hereby incorporated herein by reference.

TECHNICAL FIELD

The present disclosure relates to a fuel tube protector for a vehicle.

BACKGROUND

Recently, as eco-friendly vehicles such as a hybrid vehicle and a plug-in hybrid vehicle increase and vehicles become more high performance, parts installed in an engine room are increasing.

Therefore, a space for disposing a fuel tube in the engine room is narrowed, and the possibility of damage to the fuel tube due to the movement and push of the pails in the engine room when the collision of the vehicle occurs also increases.

Therefore, to prevent the damage to the fuel tube and the resulting leakage, the use of a steel protector for protecting the fuel tube in the engine room is increasing.

Conventionally, the path of the fuel tube has been set and the steel protector has been mounted to prevent the damage to the fuel tube considering the movement of the pails in the engine room when the collision of the vehicle occurs.

Referring to FIG. 10, a steel protector 1 is installed at various positions such as the upper portion, the lower portion, the central portion, and the like of the engine room to protect a fuel tube 2 disposed along a certain path in the engine room, and as the number of installations of the protector of a steel material increases, there are problems that increase the cost and the weight.

Further, since the conventional steel protector should be mounted on a vehicle body, there is a limitation that it is difficult to apply it to the position of the engine room where the path of the fuel tube is complicated or the mounting is impossible.

The above information disclosed in this Background section is only for enhancement of understanding of the background of the disclosure and accordingly it may contain information that does not form the prior art that is already known to a person of ordinary skill in the art.

SUMMARY

The present disclosure relates to a fuel tube protector for a vehicle. Particular embodiments relate to a fuel tube protector for preventing damage to a fuel tube disposed in an engine room and the resulting leakage of fuel.

Embodiments of the present disclosure solve problems occurring in the prior art. An embodiment of the present disclosure provides a fuel tube protector for a vehicle, which may prevent damage to a fuel tube disposed in an engine room and the resulting leakage of fuel, reduce the cost and the weight compared to the case of protecting the fuel tube by using a conventional steel protector, and improve ease of application regardless of the wiring path of the fuel tube and the mounting position of the protector.

Therefore, embodiments of the present disclosure provide a fuel tube protector for a vehicle including a protective member formed to surround the circumferential surface of a fuel tube disposed between a fuel tank and an internal combustion engine, and a fixing member provided at the distal ends of both sides of the protective member to fix the protective member to the fuel tube. The fixing member is configured to include a body for surrounding and holding the circumferential surface of the fuel tube, and first fixing legs protruded from at least one side surface of both side surfaces of the body to be fastened to the distal end portion of the protective member.

According to an embodiment of the present disclosure, the body is provided with a first tube through hole disposed in the form through which the fuel tube has passed, and the first fixing legs are formed to be protruded from the side surface of the body to be disposed at the edge of the first tube through hole.

According to an embodiment of the present disclosure, the first fixing legs are arranged in the circumferential direction of the first tube through hole, each of the first fixing legs is configured to include a tapered part formed to be tapered toward the outside of the body and a leg latching protrusion formed at the end of the tapered part, and the distal end portion of the protective member is latched and fastened to the leg latching protrusion when being fitted into the first fixing leg along the tapered part.

According to an embodiment of the present disclosure, the tapered part and the leg latching protrusion are formed on the outside surface or formed on the inside surface of the first fixing leg.

Further, according to an embodiment of the present disclosure, the body is provided with a second tube through hole disposed in the form through which an additional tube has passed, and the second tube through hole is disposed in a line with the first tube through hole.

According to an embodiment of the present disclosure, second fixing legs fastened to the distal end portion of an additional protective member are provided to be protruded from at least one side surface of both side surfaces of the body, and the second fixing legs are disposed at the edge of the second tube through hole.

Further, according to an embodiment of the present disclosure, the body is composed of a first body part and a second body part formed integrally at both sides of a hinge part, and the first body part and the second body part are rotated toward each other with respect to the hinge part to be coupled to each other while surrounding the circumferential surface of the fuel tube. A hooking part is provided on one body part of the first body part and the second body part and the other body part is provided with a body latching protrusion to which the hooking part is latched and fastened.

Further, according to an embodiment of the present disclosure, the protective member is formed to be bendable integrally with the fuel tube in a state that has surrounded the circumferential surface of the fuel tube between the fixing members coupled to the distal end portions of both sides of the protective member. Specifically, the protective member may be formed in a coil spring shape that spirally surrounds the circumferential surface of the fuel tube.

The fuel tube protector according to embodiments of the present disclosure configured as above-described may provide the following effects.

Firstly, it is possible to prevent the damage to the fuel tube and the resulting leakage of fuel, and to reduce the cost and the weight compared to the case of protecting the fuel tube by using the conventional steel protector.

Secondly, it is easy to apply it regardless of the wiring path of the fuel tube and the mounting position of the protector.

Thirdly, it is possible to apply it to the main section of the fuel tube where the damage problem occurs at the collision of the vehicle without adding a separate cost.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 1 is an exploded perspective diagram illustrating a fuel tube protector according to a first embodiment of the present disclosure;

FIG. 2 is a coupling perspective diagram illustrating the fuel tube protector according to the first embodiment of the present disclosure;

FIG. 3 is a side diagram illustrating the fuel tube protector according to the first embodiment of the present disclosure;

FIG. 4 is an exemplary diagram illustrating the risk section of the fuel tube at the collision of a vehicle;

FIG. 5 is a diagram illustrating a state before and after assembling a fixing member according to the first embodiment of the present disclosure;

FIG. 6 is a side diagram illustrating the fixing member according to the first embodiment of the present disclosure;

FIG. 7 is a perspective diagram illustrating a fixing member according to a second embodiment of the present disclosure;

FIG. 8 is a perspective diagram illustrating a fixing member according to a third embodiment of the present disclosure;

FIG. 9 is a side diagram illustrating a fuel tube protector according to a fourth embodiment of the present disclosure; and FIG. 10 is an exemplary diagram illustrating a fuel tube to which a conventional steel protector has been applied.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent sections of the present disclosure throughout the several figures of the drawings.

DETAILED DESCRIPTION OF ILLUSTRATIVE EMBODIMENTS

A vehicle using an internal combustion engine is provided with a fuel tank for storing fuel of the internal combustion engine. In the case of a vehicle in which the internal combustion engine is positioned at the front of the vehicle, the fuel tank is typically positioned at the rear of the vehicle and may be positioned downward from the rear seat, for example.

The internal fuel of the fuel tank is pressed at a certain pressure by the fuel pump to be sent to the internal combustion engine, and at this time, the fuel is transferred to the internal combustion engine through the fuel tube.

Various parts in addition to the internal combustion engine are mounted in the engine room in which the internal combustion engine has been mounted, and the fuel tube is disposed to secure a certain gap to prevent damage caused by the parts in the engine room.

However, at the collision of the vehicle, if the gap with the parts in the engine room is narrow or the parts are pushed out, damage such as the fuel tube being compressed by the surrounding parts occurs, and leakage due to the damage to the fuel tube occurs.

Embodiments of the present disclosure provide a fuel tube protector in which it is possible to prevent the damage to the fuel tube and to reduce the cost and the weight compared to the conventional steel protector, and further, it is easy to apply it regardless of the wiring path of the fuel tube and the mounting position of the protector.

FIG. 1 is an exploded perspective diagram illustrating a fuel tube protector according to a first embodiment of the present disclosure, FIG. 2 is a coupling perspective diagram illustrating the fuel tube protector according to the first embodiment of the present disclosure, FIG. 3 is a side diagram illustrating the fuel tube protector according to the first embodiment of the present disclosure, and FIG. 4 is an exemplary diagram illustrating the risk section of the fuel tube at the collision of a vehicle.

Further, FIG. 5 is a diagram illustrating a state before and after assembling a fixing member according to the first embodiment of the present disclosure, FIG. 6 is a side diagram illustrating the fixing member according to the first embodiment of the present disclosure, FIG. 7 is a perspective diagram illustrating a fixing member according to a second embodiment of the present disclosure, FIG. 8 is a perspective diagram illustrating a fixing member according to a third embodiment of the present disclosure, and FIG. 9 is a side diagram illustrating a fuel tube protector according to a fourth embodiment of the present disclosure.

As illustrated in FIG. 1, FIG. 2 and FIG. 3, a fuel tube protector 100 is configured to include a protective member no for protecting a fuel tube 200 and a fixing member 120 for fixing the protective member no to the fuel tube 200.

The fuel tube 200 is disposed between the fuel tank and the internal combustion engine to provide the transfer path of the fuel transferred from the fuel tank to the internal combustion engine.

The protective member no is formed to surround the circumferential surface of the fuel tube 200. The protective member 110 may be formed to surround the fuel tube 200 at a certain interval from the circumferential surface of the fuel tube 200 in the radius direction of the fuel tube 200. That is, a certain gap may exist between the inner circumferential surface of the protective member no and the circumferential surface of the fuel tube 200.

More specifically, the protective member 110 may be formed in a coil spring shape that spirally surrounds the circumferential surface of the fuel tube 200. The protective member no may be formed in a coil spring shape to be easily bent integrally with the fuel tube 200 in a state of surrounding the circumferential surface of the fuel tube 200.

That is, the protective member no is formed to be bendable integrally with the fuel tube 200 in a state of surrounding the circumferential surface of the fuel tube 200 between the fixing members 120 coupled to the distal end portions of both ends of the protective member no, respectively.

The protective member no may also be easily applied to a portion where the bending of the fuel tube 200 is somewhat severe and, therefore, it is difficult to apply the conventional steel protector.

As illustrated in FIG. 4, the protective member no may be applied to the section with a high risk of damage at the collision of the vehicle among the entire section of the fuel tube 200, and the fuel tube 200 may be mounted and supported to a vehicle body in the engine room in the section where the protective member no is not applied.

Further, the wire diameter and pitch of the protective member no may be adjusted by being optimized according to the vehicle.

The fixing member 120 is configured to be disposed at the distal ends of both ends of the protective member no to serve to fix the protective member no to the fuel tube 200.

As illustrated in FIG. 5, FIG. 6, FIG. 7 and FIG. 8, the fixing member 120 may be configured to include a body 121 for surrounding and holding the circumferential surface of the fuel tube 200 and first fixing legs 122 protruded from at least one side surface of both side surfaces of the body 121 to be fastened to the distal end portion of the protective member no.

The body 121 is provided with a first tube through hole 123 disposed in the form through which the fuel tube 200 has passed, and the first fixing legs 122 are formed to be protruded from the side surface of the body 121 to be disposed at the edge of the first tube through hole 123.

The first fixing legs 122 are arranged in the circumferential direction of the first tube through hole 123 at the edge of the first tube through hole 123, and the distal end portion of the protective member no may be fitted into and coupled to the outside or the inside of the first fixing legs 122.

When the distal end portion of the protective member no is coupled with the first fixing leg 122, elastic deformation occurs at least at one side of the first fixing leg 122 and the protective member no.

That is, when the distal end portion of the protective member no is fitted into the first fixing leg 122, the first fixing leg 122 may be pressed by the distal end portion of the protective member no to be elastically deformed, or the distal end portion of the protective member no may be pressed by the first fixing leg 122 to be elastically deformed, or the protective member no and the first fixing leg 122 may be pressed by each other to be elastically deformed.

At this time, to reduce the force of fitting the protective member no into the first fixing leg 122, each of the first fixing legs 122 may be configured to include a tapered part 122a formed to be tapered toward the outside of the body 121 and a leg latching protrusion 122C formed at the end of the tapered part 122a.

The distal end portion of the protective member no is fitted into the first fixing leg 122 while sliding on the surface (inclined surface) of the tapered part 122a, and at this time, the distal end portion of the protective member no is latched and coupled to the leg latching protrusion 122c.

As illustrated in FIG. 5, FIG. 6, FIG. 7 and FIG. 8, the tapered part 122a and the leg latching protrusion 122C may be formed on the outside surface of the first fixing leg 122 or formed on the inside surface of the first fixing leg 122.

If the tapered part 122a and the leg latching protrusion 122C are formed on the outside surface of the first fixing leg 122, the distal end portion of the protective member no may be expanded by being spread to the outside while being fitted into the first fixing leg 122 along the inclined surface of the tapered part 122a and may be restored by the elasticity when being latched to the leg latching protrusion 122c.

Further, if the tapered part 122a and the leg latching protrusion 122C are formed on the outside surface of the first fixing leg 122, the first fixing legs 122 may be bent in a direction of being collected toward each other when the distal end portion of the protective member no is fitted along the tapered part 122a and may be restored by the elasticity when the distal end portion of the protective member no is latched to the leg latching protrusion 122c.

When the distal end portion of the protective member no or the first fixing legs 122 are elastically restored, the distal end portion of the protective member no may be completely fastened to the first fixing leg 122 while being latched to the leg latching protrusion 122C.

Further, if the tapered part 122a and the leg latching protrusion 122C are formed on the inside surface of the first fixing leg 122, the distal end portion of the protective member no may be shrunk inward and reduced while being fitted into the first fixing leg 122 along the surface (inclined surface) of the tapered part 122a and may be restored by the elasticity when being latched to the leg latching protrusion 122C.

Further, if the tapered part 122a and the leg latching protrusion 122C are formed on the inside surface of the first fixing leg 122, the first fixing legs 122 may be bent in a direction of being spread from each other when the distal end portion of the protective member no is fitted along the tapered part 122a and may be restored by the elasticity when the distal end portion of the protective member no is latched to the leg latching protrusion 122C.

Likewise, when the distal end portion of the protective member no or the first fixing legs 122 are elastically restored, the distal end portion of the protective member no may be completely fastened to the first fixing leg 122 while being latched to the leg latching protrusion 122C.

By such fastening, the first fixing legs 122 hold the protective member no to be fixed at a predetermined position of the fuel tube 200.

Further, as illustrated in FIG. 6, the first fixing legs 122 may apply the position of the leg latching protrusion 122C differently from each other considering the pitch of the protective member no.

Further, as illustrated in FIG. 2, the body 121 may be provided with a second tube through hole 125 disposed in the form through which a separate additional tube 300 has passed. The second tube through hole 125 may be disposed in a line with the first tube through hole 123 adjacent to the first tube through hole 123.

Further, as illustrated in FIG. 8 and FIG. 9, the second fixing legs 124 fastened to the distal end portion of an additional protective member 130 may be provided to be protruded from at least one side surface of both side surfaces of the body 121, and the second fixing legs 124 may be disposed at the edge of the second tube through hole 125.

The second fixing legs 124 may be formed in the same shape as the first fixing leg 122 to be applied to perform the same function. The additional protective member 130 may also be formed in the same shape as the protective member no to be applied to perform the same function.

More specifically, the second fixing legs 124 may be configured to include a tapered part 124a formed to be tapered toward the outside of the body 121 and a leg latching protrusion 124c formed at the end of the tapered part 124a, respectively. The additional protective member 130 may be formed in a coil spring shape.

The additional tube 300 may be a tube for the flow of fuel evaporation gas generated in the fuel tank or a tube for the flow of fuel recovered to the fuel tank. Further, the additional tube 300 is a tube arranged in parallel with the fuel tube 200 in at least some sections of the fuel tube 200 disposed between the fuel tank and the internal combustion engine.

The additional tube 300 may be fixed in the form having passed through the second tube through hole 125 to be supported in a state that has been bundled with the fuel tube 200 by the body 121. Further, the additional tube 300 may be protected by being surrounded by the additional protective member 130.

As described above, since the fixing member 120 bundles and clamps the fuel tube 200 and the additional tube 300, there is no need to be mounted separately to the vehicle body, and therefore, the fixing member 120 may also be easily applied to the position where it is difficult to mount the conventional steel protector.

Further, as illustrated in FIG. 5 and FIG. 7, the body 121 may further have a first close-contact protrusion 126 for preventing the sliding of the fuel tube 200 disposed in the first tube through hole 123 and a second close-contact protrusion 127 for preventing the sliding of the additional tube 300 inserted into the second tube through hole 125.

The first close-contact protrusion 126 is formed to be protruded from the inside surface of the body 121 to face the center portion of the first tube through hole 123. The first close-contact protrusion 126 may be in close contact with the circumferential surface of the fuel tube 200 fitted into the first tube through hole 123, thereby preventing the fuel tube 200 from sliding on the first tube through hole 123.

Likewise, the second close-contact protrusion 127 is formed to be protruded from the inside surface of the body 121 to face the center portion of the second tube through hole 125. The second close-contact protrusion 127 may be in close contact with the circumferential surface of the additional tube 300 fitted into the second tube through hole 125, thereby preventing the additional tube 300 from sliding on the second tube through hole 125.

Meanwhile, as illustrated in FIG. 5, the body 121 may be configured to include a hinge part 121C, and a first body part 121a and a second body part 121b formed integrally at the ends of both sides of the hinge part 121C. The first body part 121a and the second body part 121b may be rotated toward each other with respect to the hinge part 121C to be coupled to each other while surrounding the circumferential surfaces of the fuel tube 200 and the additional tube 300 (see FIG. 2 and FIG. 9).

That is, the body 121 has the first body part 121a and the second body part 121b coupled to each other while the hinge part 121C is folded in half, and when the first body part 121a and the second body part 121b are coupled to each other, they surround and hold the fuel tube 200 and the additional tube 30o in the circumferential direction thereof. At this time, the fuel tube 200 and the additional tube 30o become a state as if they have been fitted by passing through the body 121.

A hooking part 128 is provided on one body part of the first body part 121a and the second body part 121b for coupling the first body part 121a and the second body part 121b and the other body part is provided with a body latching protrusion 129 to which the hooking part 128 is latched and fastened.

More specifically, the body 121 is formed with the first tube through hole 123 and the second tube through hole 125 when the first body part 121a and the second body part 121b are coupled in a state that is rotated and facing each other, the fuel tube 200 is seated in the first tube through hole 123, and the additional tube 30o is seated in the second tube through hole 125.

Further, when the first body part 121a and the second body part 121b are completely coupled to each other, the first fixing legs 122 are arranged in the circumferential direction of the fuel tube 200 and the second fixing legs 124 are arranged in the circumferential direction of the additional tube 300.

When the fixing member 120 including the body 121 is molded, the hinge part 121C, the first body part 121a, and the second body part 121b are formed integrally with each other, and the hooking part 128 of the first body part 121a and the body latching protrusion 129 of the second body part 121b are formed in a separated state before being fastened to each other. The first fixing legs 122 and the second fixing leg 124 are also formed integrally with the body 121.

More specifically, the body 121 of the fixing member 120 is folded to be mounted to the circumferential surfaces of the fuel tube 200 and the additional tube 30o in a state that fits the protective member no into the circumferential surface of the fuel tube 200 and fits the additional protective member 130 into the circumferential surface of the additional tube 300, then the distal end portion of the protective member no is fitted into and coupled to the first fixing legs 122, and the distal end portion of the additional protective member 130 is fitted into and coupled to the second fixing legs 124.

At this time, since the interference between the first fixing leg 122 and the protective member no and the interference between the second fixing leg 124 and the additional protective member 130 may occur, the body 121 may be folded to surround the fuel tube 200 and the additional tube 30o in a state where the protective member no and the additional protective member 130 have been slightly compressed.

As described above, although the embodiments of the present disclosure have been described in detail, the scope of the present disclosure is not limited to the above-described embodiments, and various modifications and improvements of those skilled in the art using the basic concept of the present disclosure defined in the following claims are also included in the scope of the present disclosure.

What is claimed is:

1. A fuel tube protector for a vehicle, the fuel tube protector comprising:
   a protective member configured to surround a circumferential surface of a predetermined portion of a fuel tube disposed between a fuel tank and an internal combustion engine; and
   a fixing member provided at both distal ends of the protective member, the fixing member configured to fix the protective member to the fuel tube, wherein each fixing member comprises:
   a body surrounding and holding the circumferential surface of the fuel tube; and
   first fixing legs protruding from a side surface of the body and fastened to the respective distal end of the protective member,
   wherein the body comprises a first tube through hole, the fuel tube passing through the first tube through hole,
   wherein the first fixing legs protrude from the side surface of the body to be disposed at an edge of the first tube through hole,
   wherein the first fixing legs are arranged in a circumferential direction of the first tube through hole, wherein each of the first fixing legs comprises a tapered part tapering toward an outside of the body and a leg latching protrusion formed at an end of the tapered part, and wherein each distal end portion of the protective member is latched and fastened to the leg latching protrusion when fitted into the first fixing leg along the tapered part.

2. The fuel tube protector of claim 1, wherein the tapered part and the leg latching protrusion are formed on an outside surface of the first fixing leg.

3. The fuel tube protector of claim 1, wherein the tapered part and the leg latching protrusion are formed on an inside surface of the first fixing leg.

4. The fuel tube protector of claim 1,
wherein the body is provided with a second tube through hole through which an additional tube passes, and
wherein the second tube through hole is disposed in a line with the first tube through hole.

5. The fuel tube protector of claim 4,
wherein second fixing legs fastened to a distal end portion of an additional protective member protrude from the side surface of the body, and
wherein the second fixing legs are disposed at an edge of the second tube through hole.

6. The fuel tube protector of claim 1,
wherein the body comprises a first body part and a second body part formed integrally at both sides of a hinge part, and
wherein the first body part and the second body part are configured to be rotated toward each other with respect to the hinge part to be coupled to each other while surrounding the circumferential surface of the fuel tube.

7. The fuel tube protector of claim 6, wherein a hooking part is provided on either the first body part or the second body part and the other of the first body part or the second body part is provided with a body latching protrusion to which the hooking part is latched and fastened.

8. The fuel tube protector of claim 1, wherein the protective member is configured to be bendable integrally with the fuel tube when the protective member surrounds the circumferential surface of the fuel tube between the fixing members coupled to the distal ends of the protective member.

9. The fuel tube protector of claim 8, wherein the protective member is formed in a coil spring shape that spirally surrounds the circumferential surface of the fuel tube.

10. A vehicle comprising:
a vehicle body including an engine room;
a fuel tank disposed within the vehicle body;
an internal combustion engine disposed within the engine room;
a fuel tube disposed between the fuel tank and the internal combustion engine;
a protective member surrounding a circumferential surface of the fuel tube, wherein the protective member surrounds a predetermined portion of the fuel tube disposed in the engine room, the fuel tube being disposed between the fuel tank and the internal combustion engine; and a first fixing member and a second fixing member provided at respective distal ends of the protective member and fixing the protective member to the fuel tube, wherein each of the first fixing member and the second fixing member comprises:
a body surrounding and holding the circumferential surface of the fuel tube; and
first fixing legs protruding from a side surface of the body and fastened to the respective distal end of the protective member,
wherein the body comprises a first tube through hole,
wherein the fuel tube passes through the first tube through hole,
wherein the first fixing legs protrude from the side surface of the body to be disposed at an edge of the first tube through hole,
wherein the first fixing legs are arranged in a circumferential direction of the first tube through hole,
wherein each of the first fixing legs comprises a tapered part tapering toward an outside of the body and a leg latching protrusion formed at an end of the tapered part, and
wherein each distal end portion of the protective member is latched and fastened to the leg latching protrusion when fitted into the first fixing leg along the tapered part.

11. The vehicle of claim 10, wherein the tapered part and the leg latching protrusion are formed on an outside surface of the first fixing leg or on an inside surface of the first fixing leg.

12. The vehicle of claim 10, further comprising a second tube through hole provided in the body,
wherein an additional tube passes through the second tube through hole, and
wherein the second tube through hole is disposed in a line with the first tube through hole.

13. The vehicle of claim 12, further comprising second fixing legs fastened to a distal end portion of an additional protective member, the second fixing legs protruding from the side surface of the body, wherein the second fixing legs are disposed at an edge of the second tube through hole.

14. The vehicle of claim 10,
wherein the body comprises a first body part and a second body part formed integrally at both sides of a hinge part, and
wherein the first body part and the second body part are configured to be rotated toward each other with respect to the hinge part to be coupled to each other while surrounding the circumferential surface of the fuel tube.

15. The vehicle of claim 14, further comprising:
a hooking part provided on either the first body part or the second body part; and
a body latching protrusion provided on the other of the first body part or the second body part, wherein the hooking part is configured to be latched and fastened and with the body latching protrusion.

16. The vehicle of claim 10, wherein the protective member is formed in a coil spring shape that spirally surrounds the circumferential surface of the fuel tube and is bendable integrally with the fuel tube.

* * * * *